United States Patent [19]

Gillingham et al.

[11] Patent Number: 4,810,152
[45] Date of Patent: Mar. 7, 1989

[54] STICKER POSITIONING APPARATUS FOR USE WITH LUMBER STACKER

[76] Inventors: Larry A. Gillingham, 1707 Airpark Dr., Veradale, Wash. 99037; Thomas S. Best, S. 7104 Cedar Rd., Spokane, Wash. 99204

[21] Appl. No.: 134,887

[22] Filed: Dec. 18, 1987

[51] Int. Cl.$^4$ .............................................. B65G 57/26
[52] U.S. Cl. .................................. 414/789.5; 198/367; 198/463.6; 198/728; 198/735; 414/745.7
[58] Field of Search .......................... 414/41, 42, 748; 198/367, 463.4, 463.6, 728, 735

[56] References Cited

U.S. PATENT DOCUMENTS

| | | | |
|---|---|---|---|
| 1,796,575 | 3/1931 | Morgan | 414/42 X |
| 2,937,739 | 5/1960 | Levy | 198/367 X |
| 3,292,783 | 12/1966 | Quist et al. | 414/41 X |
| 3,738,510 | 6/1973 | Mason | 414/42 X |
| 3,904,044 | 9/1975 | Lunden | 414/42 X |
| 4,360,303 | 11/1982 | Rysti | 414/42 |

FOREIGN PATENT DOCUMENTS

3622980 1/1987 Fed. Rep. of Germany ... 198/463.4

Primary Examiner—Leslie J. Paperner
Attorney, Agent, or Firm—Keith S. Bergman

[57] ABSTRACT

Apparatus is disclosed for accurately positioning stickers when stacking lumber. The apparatus provides an unscrambling conveyer that feeds stickers from a bulk supply to a crowder feed conveyer to present a constant supply of stickers to a timed release mechanism. The release mechanism by cam means sequentially presents individual stickers in a timed fashion to an endless distribution conveyer that initially feeds stickers through an upper horizontal feed plane about a curved guide structure, and finally about a second horizontal feed plane below the first. The stickers are maintained in the second feed plane by an underlying bottom shelf structure. The bottom shelf structure feeds individual stickers into a plurality of sticker positioners that oscillate from an upper position downwardly to feed the stickers onto a top of a lumber stack to accurately position them in spaced relation on a stack of lumber therebeneath.

9 Claims, 6 Drawing Sheets

STICKER POSITIONING APPARATUS FOR USE WITH LUMBER STACKER

BACKGROUND OF INVENTION

A. Related Applications

There are no applications for patent relating hereto heretofore filed in this or any foreign county.

B. Field of Invention

Our invention relates generally to a sticker positioning apparatus and more particularly to such apparatus that precisely positions stickers onto a lumber stack immediately therebeneath.

C. Description of the Prior Art

Lumber is cut at geographically convenient sawmills from fresh cut or so called "green" logs that have been stockpiled in yards at the sawmills. Such logs may remain outdoors for extended periods of time awaiting processing and, due to their cellular makeup, do not dry to thereby require rough lumber cut from them to be dried prior to finishing and sale to minimize warpage. Green lumber in the industry is stacked in tiered arrays for subsequent air or kiln drying. To enhance the drying procedure, spacers, or "stickers" as they are known in the industry, are positioned between successive horizontal tiers to permit circulation of drying air between the tiers of freshly cut lumber. The so arranged stacks of lumber thereby present both faces of green lumber to effectively utilize drying air.

It is important in the stacking of lumber in layers for drying to have stickers be not only horizontally spaced in a predetermined array, but also that the stickers separating the tiers themselves be in substantial vertical alignment to one another. This alignment is important, firstly because it limits shear forces from being imposed on the respective layers of freshly cut lumber and thereby inhibits breaking of boards or stretching of fibers and cracking with attendant economic losses. Secondly, it enables lumber to dry without warpage induced by stickers that are vertically offset from one another. Green lumber is of a somewhat semi-plastic nature such that if any concentrated force be applied at an area of limited extent, the lumber or its fibers will permanently move to warp or take on a "set" as the condition is commonly called. This is especially true of green lumber at an elevated temperature or with a high moisture content as in a steam kiln. Warping, if it occurs, brings about substantial loss of useful boards as warped lumber is of very limited economic value.

Proper automated positioning of stickers has heretofore eluded the industry. One of the more common and fairly effective past practices to position stickers has been by manual labor, but escalating costs of labor has lowered the competitive value of this practice, so mechanical means have been sought to provide proper sticker positioning. Unfortunately the mechanical sticker positioners of the past have lacked ability to maintain stickers in a predetermined vertical array to avoid problems as noted above, have not been economically feasible, have not had required durability and reliability or have not been operative with existing stackers.

Automated sticker placement mechanisms in the past have generally positioned stickers above a lumber course merely by dropping stickers upon a lumber stack by gravity. Accordingly, the desired optimum sticker position, with vertically adjacent stickers in stacked array, is only randomly achieved as stickers tend to rebound and move after impact with a lumber stack, and may not be properly positioned in the first instance. This repositioning effect is lessened to an extent by lumber stackers that have utilized known elevator means to vertically reposition the lumber stack with each successive array positioned thereon. In this manner the height from which the stickers are dropped is lessened to lessen the randomness of their positioning. Manual labor also has been employed to assist in correctly positioning stickers on the stacking lumber to maintain their alignment, but with commensurate increases in costs of operation.

Our invention seeks to alleviate these problems, especially in an elevator-type stacking mechanism that maintains the top of a lumber stack at a predetermined vertical position. In so doing our invention residues not in any single element set forth, but rather in the synergistic combination of all of its individual structures that necessarily result in the functions flowing therefrom.

SUMMARY OF INVENTION

Our invention provides an automated sticker positioner for use with lumber stackers with elevator means that maintain a predetermined vertical height for the top tier of a lumber stack. Our positioner deposits stickers on the top of such a lumber stack at predetermined height.

Our invention provides an unscrambling conveyor to orient and remove individual stickers from a magazine supply and deliver them to a conveyor at an upper position that accumulates an orderly array of stickers in proximate relationship. A unique cam release mechanism oscillates in timed relationship to releasably position singulated stickers on an endless distribution conveyor which feeds them along a first upper horizontal course, then over the conveyor end and a curved guide member to a lower horizontal course where stickers are fed to successive oscillating sticker positioners that sequentially position individual stickers in a particular predetermined array on an uppermost tier of a lumber stack therebeneath.

The various driven members of our invention are coordinated in timed sequence to function with one another as stated. A first motor drives the unscrambling conveyor while the remainder of the system is driven by a second motor. Hydraulic cylinders drive the cam release mechanism of the crowder feed conveyor and the sticker positioners.

Our invention resides not in any of these structures or features, per se, but rather in the synergistic combination of all of them to provide the functions necessarily flowing therefrom.

In creating such a mechanism, it is:

A principal object of our invention to create an automated sticker positioning mechanism for use above a lumber stack to absolutely position spaced parallel stickers thereon at substantial speed.

A further object of our invention to provide such a device that presents randomly oriented stickers to an unscrambling conveyor, a crowder feed conveyor, and release mechanism to present them in angulated timed fashion to a distribution conveyor which distributes them to an array of sticker positioners which deliver stickers in a predetermined array onto an uppermost tier of a lumber stack.

A further object of our invention to provide a new oscillating cam type release mechanism that releases individual stickers from the crowder conveyor in predetermined timed fashion.

A still further object of our invention to provide such a mechanism that has plural spaced sticker positioners of an oscillating type that are hydraulically operated to uniquely and absolutely position stickers in a predetermined position on a lumber stack.

A still further object of our invention is to provide such a sticker positioning mechanism that allows access to its various components for maintenance and repair.

A further object of our invention to provide such a mechanism wherein a continuous supply of stickers is provided in a reliable uninterrupted manner.

A still further object of our invention to provide such a mechanism that is of new and novel design, of rugged and durable nature, of simple and economic manufacture and otherwise well suited to the uses and purposes for which it is intended.

Other and further objects of our invention will appear from the following specification and accompanying drawings which form a part hereof.

In carrying out the objects of our invention, however, it is to be understood that its essential features are susceptible of change in design and structural arrangement with only one practical and preferred embodiment being illustrated in the accompanying drawings and specified, as is required.

BRIEF DESCRIPTION OF DRAWINGS

In the accompanying drawings which form a part hereof and wherein similar numbers references refer to similar parts throughout.

DESCRIPTION OF THE PREFERRED EMBODIMENT

Our invention comprises generally an unscrambling conveyor 20 which passes stickers along skate roller means 21 to crowder feed conveyor 30, which in turn feeds stickers to distribution conveyor 50 by means of oscillating cam release mechanism 40. Curved guide member 60 cooperates with the distribution conveyor to direct stickers from an upper to a lower horizontal course where stickers are maintained by cooperation with bottom shelf 70. Oscillating sticker positioners 80 are fed stickers from this lower course from whence they are positioned onto a lumber stack.

Figure 2:
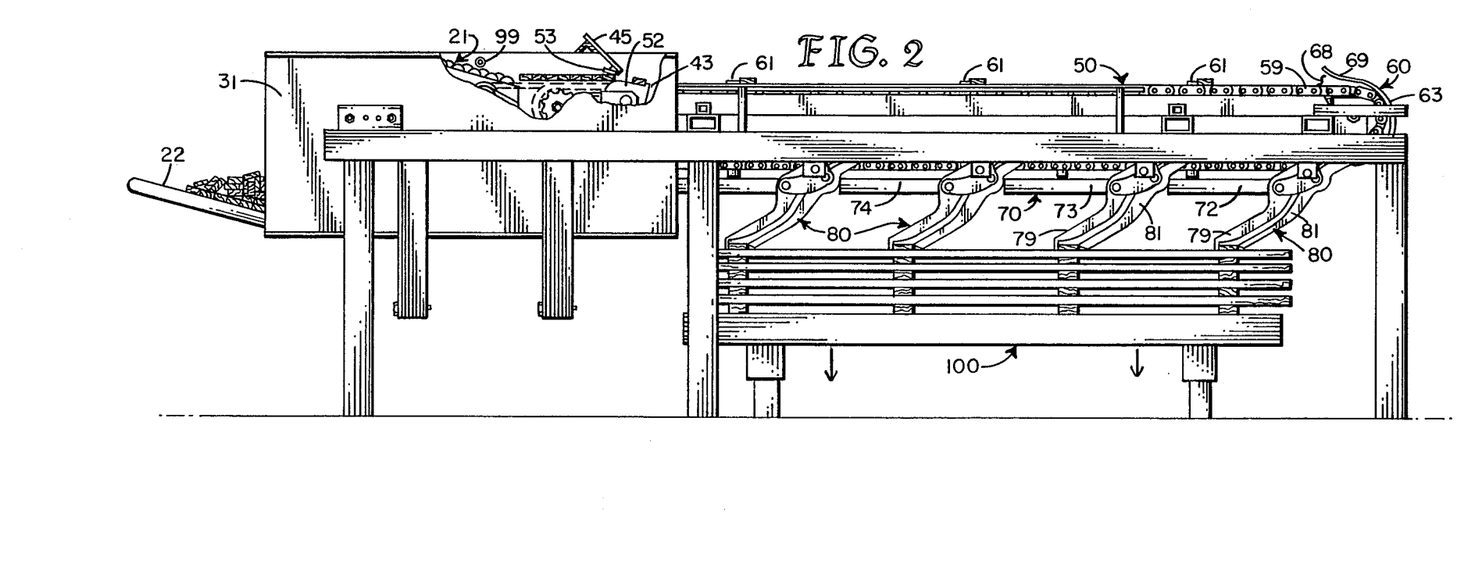
FIG. 2 is an orthographic side view of the mechanism of FIG. 1, partially cut away to more clearly illustrate the crowder feed conveyor, release mechanism, and their relationship to the distribution conveyor.
Figures 4, 5:
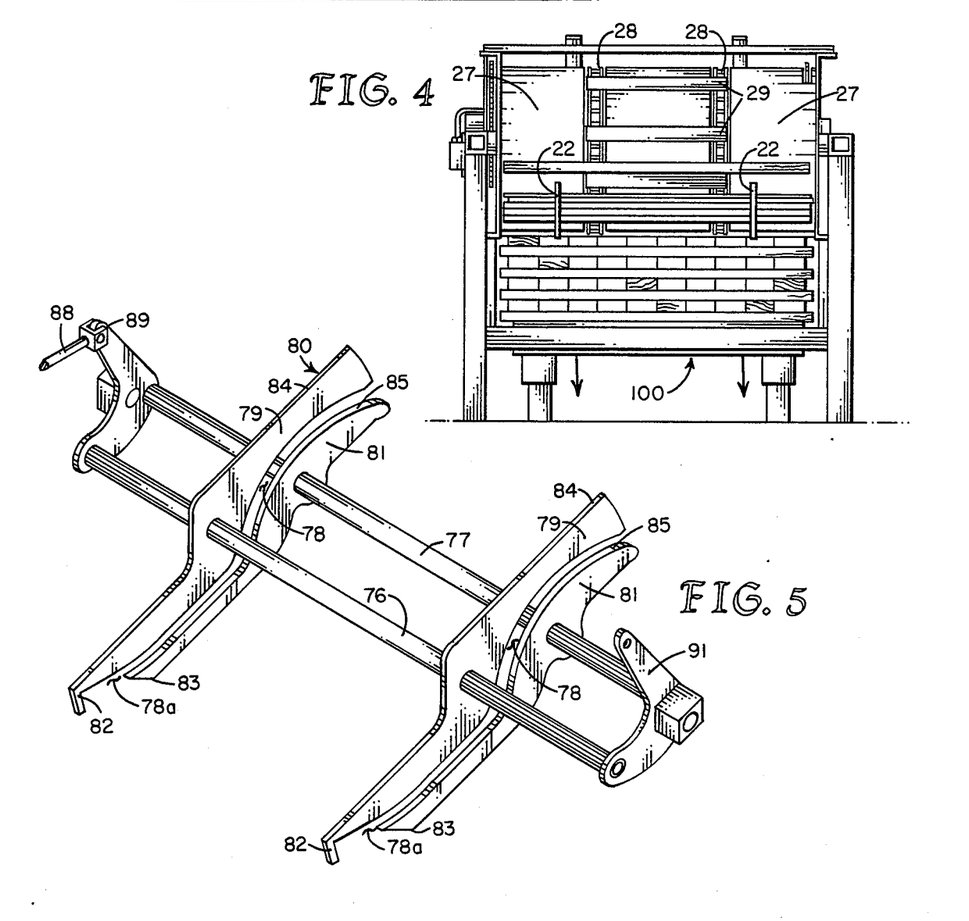
FIG. 4 is an orthographic left end view of the mechanism of FIG. 2.
FIG. 5 is an orthographic view, somewhat enlarged, of the sticker positioners mounted on support rods to further illustrate the driven bell crank lever.
Figure 13:
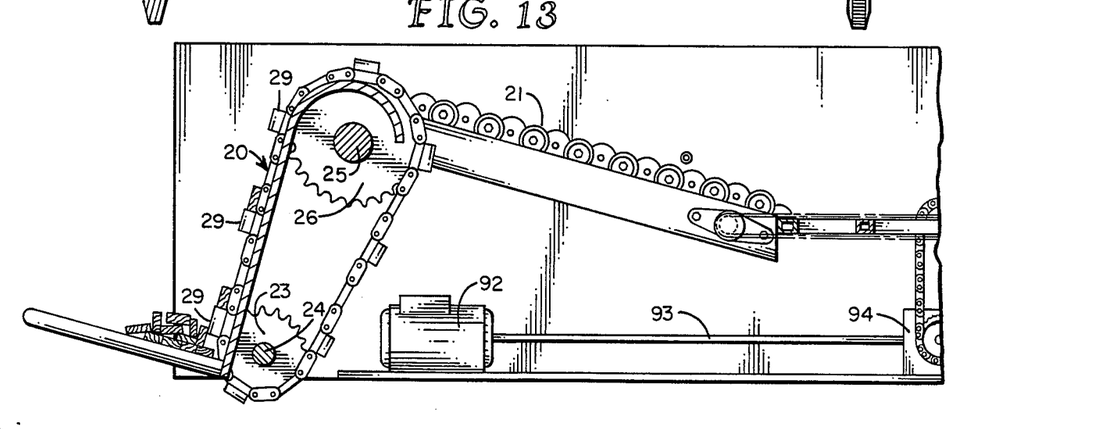
FIG. 13 is an orthographic side view of the unscrambling conveyor of the invention.

Unscrambling conveyor 20, as illustrated in FIGS. 2, 4 and 13, cooperates with a pair of magazine support arms 22 angularly oriented for reception, storage and passage of a bulk supply of randomly orientated stickers to be distributed by the instant invention. The unscrambling conveyor comprises a spaced pair of chains 28 secured to a pair of lower drive sprockets 23 which are irrotatably carried and driven by lower shaft 24. Spaced upper sprockets 26 secured to idler shaft 25 secure chains 28 to form an upwardly extending path for the endless unscrambling conveyor. Feed bars 29 are spaced along the unscrambling conveyor to accept stickers therebetween to move them along the unscrambling conveyor. Work shields 27, illustrated in FIG. 4 protect internal mechanisms of the apparatus from stickers fed upwardly by means of unscrambling conveyor's feed bars 29 and further tend to stabilize stickers fed along the surface of shields 27. Side walls 31 and 32 assist in maintaining lateral positioning of stickers on the unscrambling conveyor's feed bars.

Figure 1:
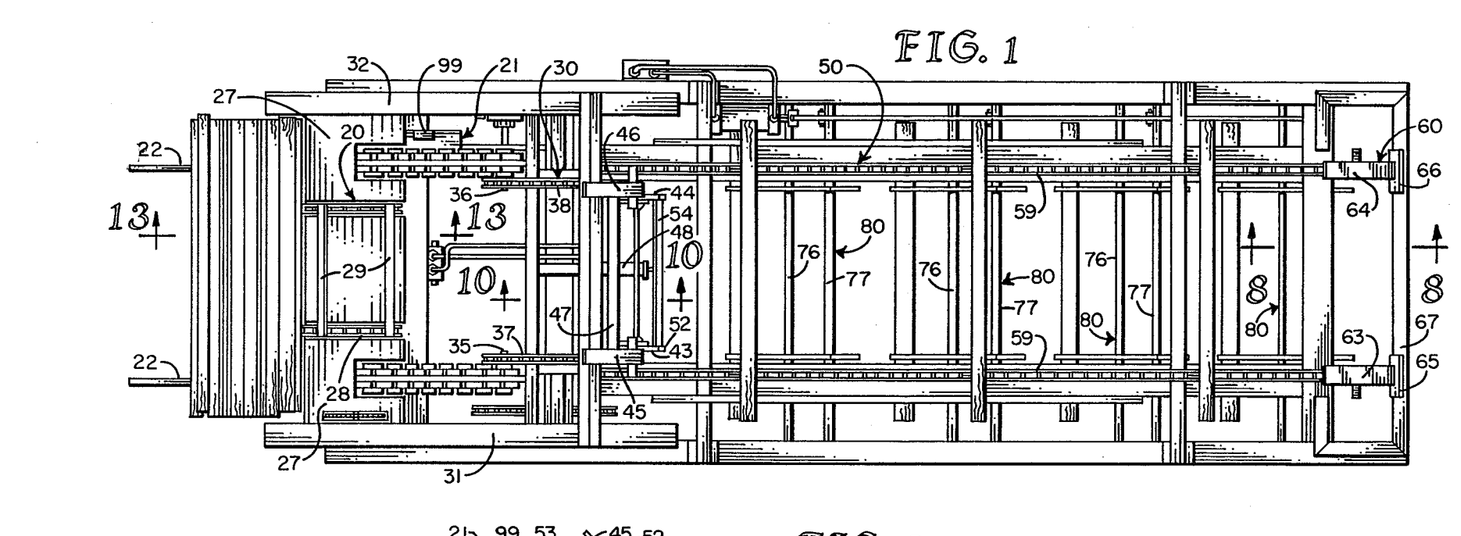
FIG. 1 is an orthographic top view of our invention showing its various parts, their configuration and relationship.

Positioned within the confines of sidewalls 31 and 32 at an upper level adjacent the unscrambler conveyor is a set of skate rollers 21 situated to accept stickers delivered by unscrambling conveyor 20. As illustrated in FIG. 1, plural rows of skate rollers cooperate with plural spaced crowder feed chains 37 and 38 to provide a continuous supply of stickers.

Figure 14:
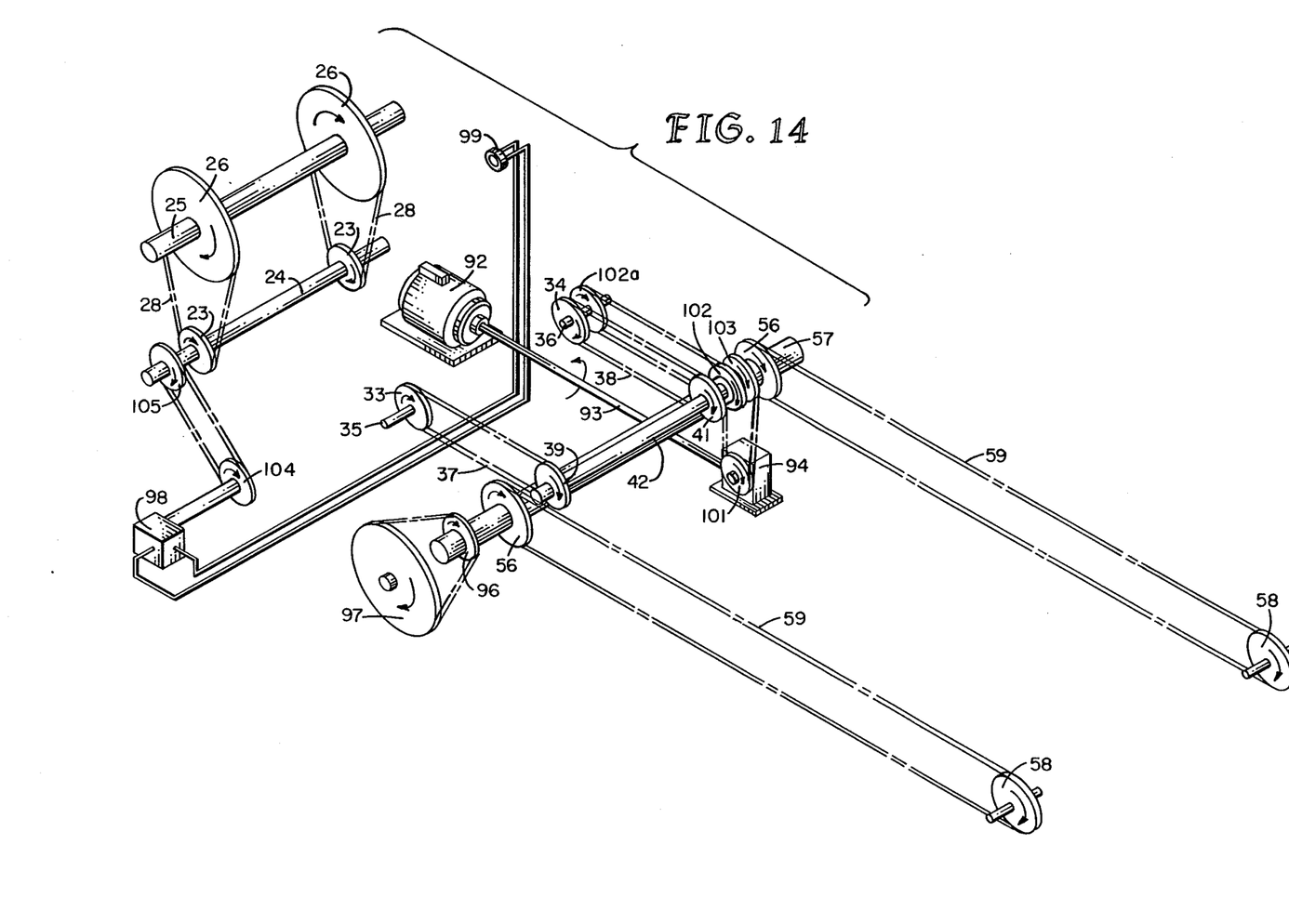
FIG. 14 is a diagrammatic view, somewhat simplified, of the drive mechanism and its driven parts illustrating the relationship therebetween.

As diagrammatically illustrated in FIG. 14, crowder feed conveyor 30 is seen to comprise rear crowder conveyor sprockets 33 and 34 supported by rearward jack shafts 35 and 36. Spaced crowder chains 37 and 38 are supported in their forward extension by respective right and left forward crowder conveyor sprockets 39 and 41 which in turn are secured to common sprocket shaft 42.

Movably secured to shaft 42 is an oscillating cam release mechanism 40 comprised of individual elements 43 and 44, as may be seen in FIG. 1. The respective cam release elements 43 and 44 cooperate with right and left abutment members 45 and 46 secured to common horizontal frame element 47.

Figure 10:
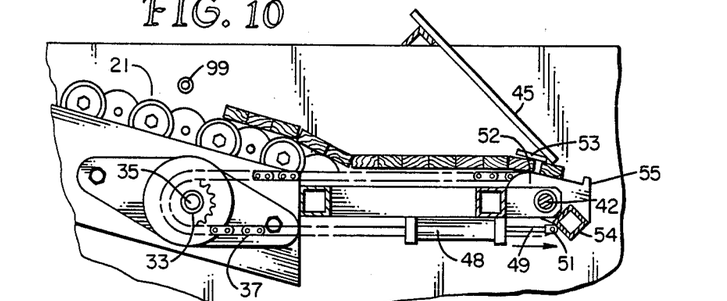
FIG. 10 is an orthographic side view, somewhat enlarged, of the skate rollers and crowder feed conveyor of FIG. 2, illustrating the cam release mechanism in the upper position to release a sticker.
Figure 11:
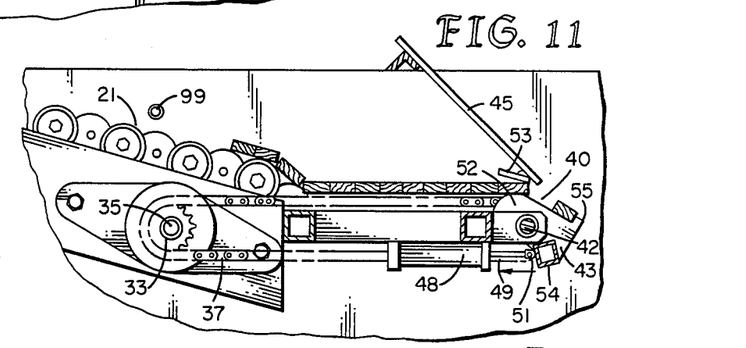
FIG. 11 is an orthographic side view, somewhat enlarged, of the skate rollers and crowder feed conveyor of FIG. 2, illustrating the cam release mechanism in the downward position clamping a forwardly positioned sticker.
Figure 12:
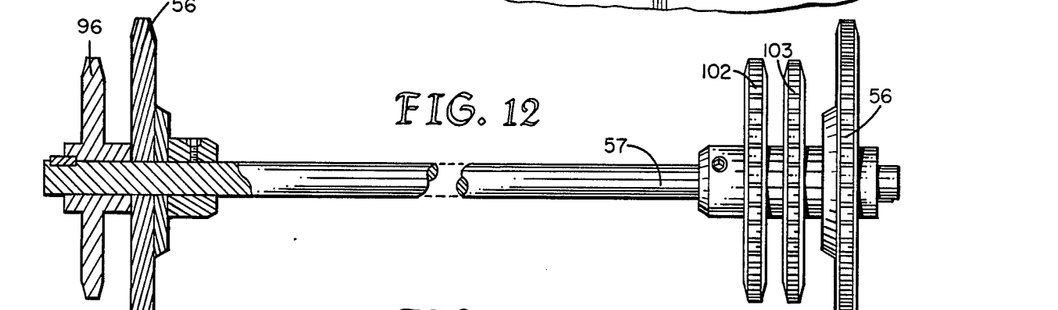
FIG. 12 is an orthographic front view of the main head shaft mechanism and its associated sprockets.

FIGS. 10 and 11 illustrate a typical operation of crowder conveyor mechanism 30 cooperating with oscillating cam release mechanism 40 to supply stickers in singulated, timed sequence. As seen in FIG. 10, sloping abutment members 45 and 46 cooperate with oscillating cam release members 43 and 44 to frictionally maintain or clamp a forward sticker on crowder chains 37 and 38 at a point of relative convergence defined by high point 52 of cam 40 and foot element 53 projecting from respective abutment members 45 and 46.

Cam release elements 43 and 44 are simultaneously actuated by double acting actuator cylinder 48 acting through reciprocating actuator rod 49 pivotally secured to connecting beam 54 at pivot point 51. Connecting beam 54 structurally joins cam members 43 and 44 by common joining practices, such as welding, threaded connections or the like commonly used in the machine art for such purposes.

Stickers delivered to skate rollers 21 proceed therealong by gravity to the crowder feed conveyor 30 and are thence fed along that conveyor to cam release mechanism 40. As illustrated, first actuator cylinder 48 is energized to oscillate connecting beam 54 and responsively cams 43 and 44 to sufficiently move high point 52 away from foot element 53 to permit a sticker to pass therebetween. Subsequent energizing of cylinder 48 will retract actuator rod 49 to a rearwardmost position to responsively oscillate cam mechanism 40 again to capture a lead sticker fed by crowder conveyor 30 between foot element 53 and point 52. A sticker released by oscillating cams 43 and 44 is retained on a forwardmost portion of cam release mechanisms 43 and 44 by a raised abutment portion 55. Raised abutment portion 55 oscillates between a raised position as illustrated in FIG. 10 to a lowered position as illustrated in FIG. 11 on a timed relationship with distribution conveyor 50 and its associated lugs 61. In the raised position as illustrated in FIG. 10, the sticker is at a height above that of lugs 61. When portions 55 are oscillated to a lower position as illustrated in FIG. 11, they are at a height to enable the respective sticker to be stripped by lugs 61 of conveyor mechanism 50.

Figure 9:
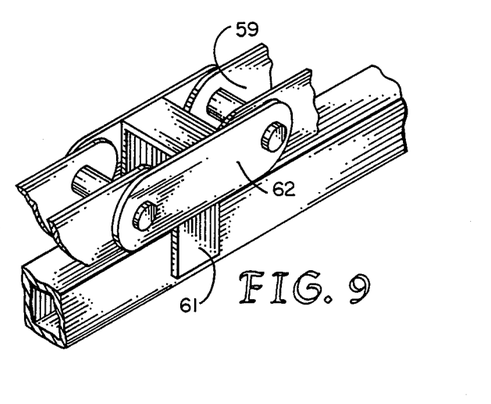
FIG. 9 is an orthographic view of the lugged chain, as utilized by the distribution conveyor, illustrating a typical "U"-shaped lug.

Distribution conveyor 50, seen in FIGS. 1 and 2, comprises rear sprockets 56 secured to main driven head shaft 57 and carrying endless spaced lugged chains 59 carried in their forward extension by spaced forward sprockets 58. Distribution conveyor 50 is mounted forwardly of oscillating cam release mechanism 40 to enable the distribution conveyor by means of its upstanding "U" shaped lugs 61 to strip and convey a sticker from forwardmost abutment portion 55 of cam release members 43, 44. FIG. 9 illustrates one of these "U" shaped lugs 61 positioned on and carried by link 62 of endless chains 59 of the distribution conveyor.

Figure 8:
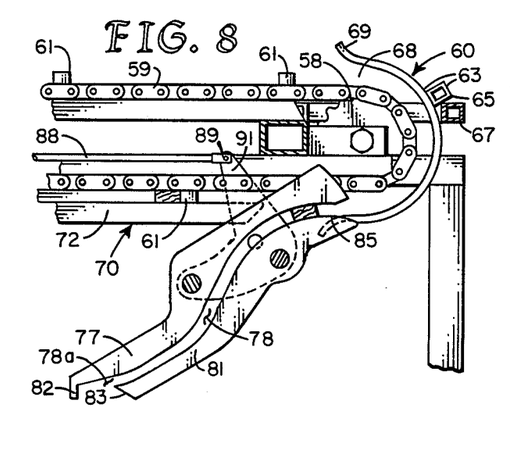
FIG. 8 is an orthographic side view of the sticker positioners in relation to the curved guide and distribution conveyor of FIG. 1, taken on the line 8—8 thereon in the direction indicated by the arrows.

FIGS. 1 and 8 illustrate the forward portion of the distribution conveyor. Confined curved passageway 68 is defined by a forwardmost sticker feed position of distribution conveyor 50 and right and left curved guides 63 and 64 respectively. These curved guides extend about the forward conveyor end and are structurally secured to the mechanism, and particularly frame element 67, by respective right and left support members 65 and 66 by common joining techniques. The upper entrance passageway 68 is defined by flared portions 69 of curved guides 63 and 64 to allow easy entrance for stickers and provide for positional deviations of stickers entering passageway 68. Lower exit portion of passageway 68 is defined by flared portion 71 providing a transition from the passageway to distribution portions of the mechanism.

Figure 6:
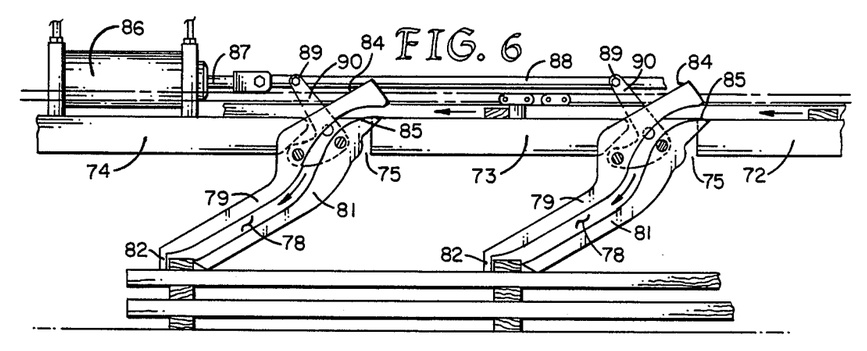
FIG. 6 is an orthographic side view of the sticker positioners of FIG. 2, somewhat enlarged, illustrating them in a lowered position.
Figure 7:
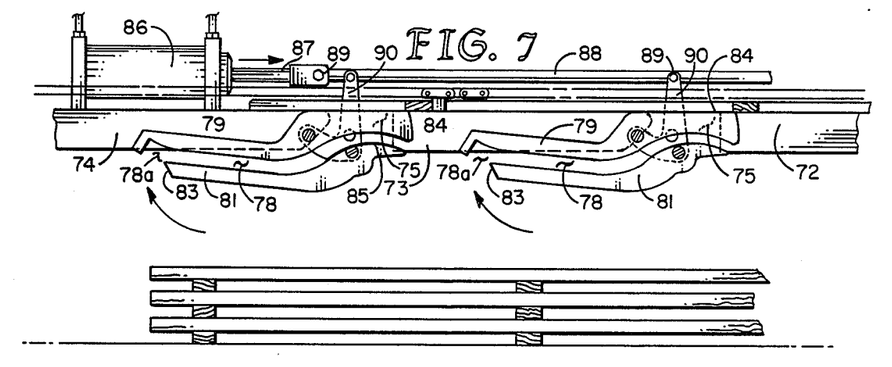
FIG. 7 is an orthographic side view, somewhat enlarged, of the sticker positioners of FIG. 2 in an raised position.

As illustrated in FIGS. 2 and 8, stickers after being transported through passageways 68, are transported either to an initial set of sticker positioners 80 or along shelf member 70 for distribution to other sticker positioners 80. Bottom shelf member 70 comprises plural individual shelf elements 72, 73, 74 positioned horizontally along both right and left sides of the mechanism exteriorly of sticker positioners 80. As shown in FIGS. 6 and 7, shelf elements are spaced to form gaps between the various elements through which stickers pass as they are fed to sticker positioners 80. FIGS. 1 and 2 illustrate the use of four pairs of sticker positioners, but it should be understood that the number of pairs utilized is dependent on the desired number of stickers per tier of lumber to be deposited and may vary accordingly.

As shown in FIG. 5, each sticker positioner pair is mounted on one of a pair of common shafts 76 and 77. Guideway 78 through which stickers pass to a lumber stack is defined by respective upper and lower portions 79 and 81 of the sticker positioners. Guideways 78 are presented to stickers when said positioners are in a lowered position. Tangs 82 formed integrally with upper portions 74 of the positioners serve as an abutment and positioner for stickers descending through guideway 78, and in cooperation with forward projection 83 of lower portion 81 form gap 78a to receive and position a sticker, as illustrated in FIGS. 2 and 6 of the drawings. Upper span 84 of the sticker positioners is configured, as illustrated in FIG. 7, to serve as a guideway or bridge for stickers in their lower course when a sticker positioner is in a raised position, spanning the space between respective bottom shelf elements 72, 73 and 74. This feature enables stickers to proceed along their lower course, as moved by distribution conveyor 50, for feed to other subsequent sticker positioner guideways 78 until stickers encounter a sticker positioner in a its lower position, as illustrated in FIG. 6. The lower span 85 of the lower portion 81 is shaped so as to guidingly support a sticker as it is fed along the bottom shelf elements into channel 78 of the positioner structure.

Lug chain 59, as seen FIG. 8, travels from its upper horizontal span about forward sprocket 58 to a lower span carrying stickers therealong by means of "U" shaped lugs 61. The "U" shaped lugs 61 are dimensioned, as seen in FIG. 9, to be spaced further apart then bottom shelf elements 72, 73 and 74 such that the absence of a sticker enables the "U" shaped lugs to ride over the bottom shelf elements and accordingly maintain and support the lug chain 59 therealong. The "U" shaped lugs are beveled at the corners and edges to minimize binding and friction between those lugs and the bottom shelf elements. When a sticker is present, its nominal thickness is greater than the projecting length of a "U" shaped lug, and so will maintain the lug chain and lugs 61 above bottom shelf elements and out of contact therewith.

FIGS. 6 and 7 illustrate the means by which sticker positioners 80 are oscillated in a timed, sequential relationship by control mechanism of the mechanism. Cylinder 86, of a hydraulic or pneumatic nature, reciprocates cylinder rod 87 connected to elongate drive rod 88. Drive rod 88 in turn is connected by pivoted connections 89 to bell cranks 90, 91 that oscillate associated sticker positioners from raised to lowered positions responsive to cylinder motion.

Coordination of the various drive systems of the apparatus is illustrated in FIG. 14. Drive motor 92 delivers power through output shaft 93 to directional change gear box 94, thence from drive sprocket 101 of that gear box to head shaft sprocket 103 carried by head shaft 57. Various driven sprockets are secured to head shaft 57. Rear driven distribution conveyor sprockets 56 an timer controlled sprocket 96 are secured to head shaft 57. Sprocket 96 drives a timer driven srocket 97 that operates via conventional cam actuated switching means (not shown) to operate, in a proper timed sequence, cylinders 48 and 86 effecting operation of oscillating cam release mechanism 40 and sticker positioners 80 respectively.

Crowder chain 37 receives power from head shaft 57 through sprocket 102 driving sprocket 102a secured to shaft 36. Left rear crowder chain sprocket 34 through the left crowder chain 38 transmits power to forward crowder chain sprockets 41 and 39 which are driven in unison by common connecting shaft 42. Right rear crowder chain sprocket 33 is an idler sprocket in this system.

Unscrambling conveyor 20 is driven by a motor means 98 independently of other drive assemblies in the instant apparatus that are driven by motor 92. Motor means 98 drives sprocket 104 which transmits motion by a drive chain to driven sprocket 105, carried on shaft 24 to drive lower unscrambling conveyor sprockets 23 carried on the same shaft to in turn drive unscrambling conveyor 20. Motor 98 is controlled by a photo-electric eye means 99 illustrated in FIGS. 10 and 14. When stickers back up along skate rollers 21 to the position of photo-electric eye 99, a circuit is opened to drive motor 98 to temporarily halt operation of the unscrambling conveyor. As a supply of stickers along crowder conveyor 30 is spent to uncover photo-electric eye means 99, motor 98 is restarted by the electric eye circuit to resupply stickers. This maintains an adequate and manageable supply of stickers on crowder conveyor 30 to be delivered to distribution conveyor 50. Sensing means equivalent to a photo-electric eye may be utilized, such as limit switches that sense a sticker supply as it backs up to a desired position. Sensors of this type employ a built-in time delay that avoids deactivating motor 98 until a sticker supply positions itself due to build up before such a sensor for a predetermined time as stickers will proceed continuously past such a sensor in their normal course of feed.

Figure 3:
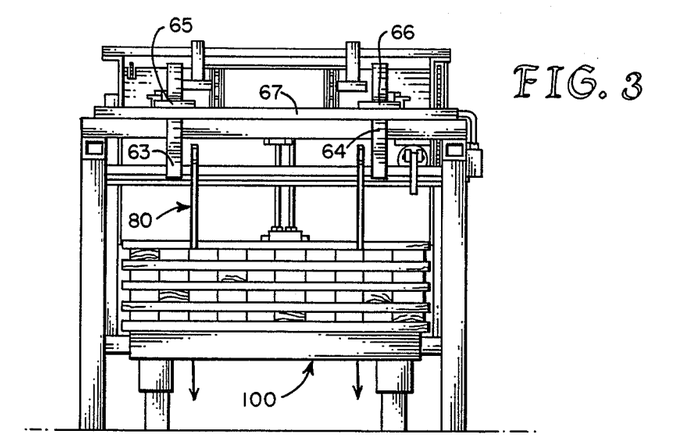
FIG. 3 is an orthographic right end view of the mechanism of FIG. 2.

The instant sticker distribution apparatus operates in cooperation with a conventional lumber stack elevator platform of present day commerce and depicted generally at 100 in FIGS. 2, 3 and 4. Elevator platform 100 and sticker positioners 80 are coordinated to maintain a height of an upper tier of lumber to receive stickers such that stickers deposited hereon will not be subject to any appeciable free fall from within the confines of the lower portion of the sticker positioners defined by gap 82. The sticker positioners also by reason of their pivotal motion allow for some vertical adjustment. Stickers will not normally reorient themselves on an upper tier of a lumber stack.

Figure 15:
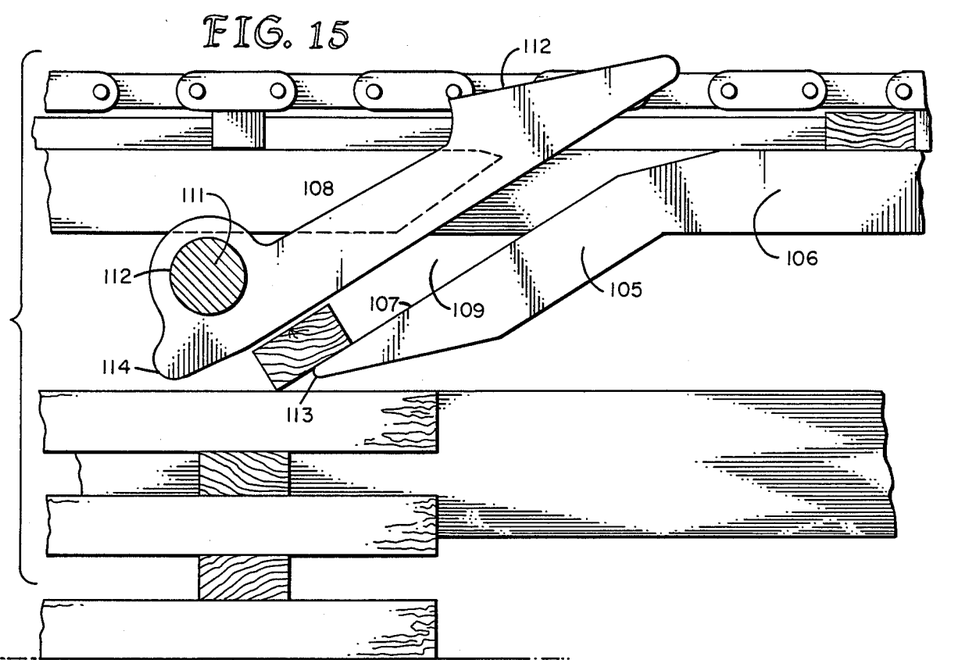
FIG. 15 is an orthographic side view, somewhat enlarged, of modified sticker positioners of FIG. 15 in a raised position.

Reference to FIG. 15 illustrates a second embodiment of the sticker positioners with only one pivoting element. In lieu of a lower portion 81 as utilized in the first embodiment of the sticker positioners, downwardly extending ramp 106 is formed as an integral extension of the lower shelf structure. This ramp is formed with sticker engaging surface 107 that in cooperation with pivoting jaw 108 forms a passageway 109 that guidingly deposits stickers onto a lumber stack in the same fashion as the first embodiment.

Pivoting jaw 108 is formed with a pivot joint formed at 110 through which pivot shaft 111 extends and is pivoted by means of a bell crank in a like fashion as set forth in the embodiment depicted in FIG. 5.

Figure 16:
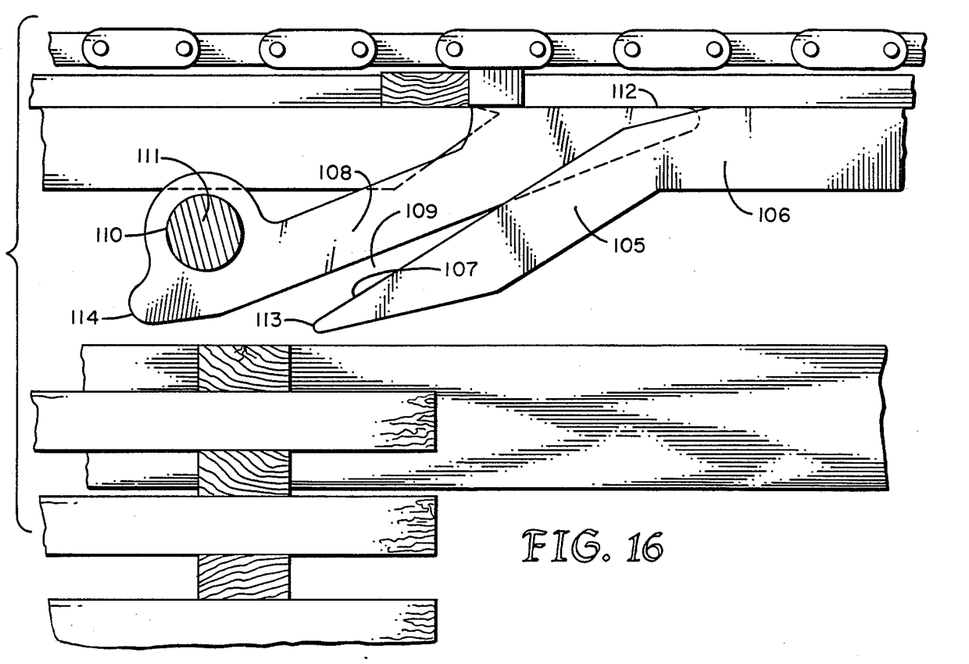
FIG. 16 is an orthographic side view, somewhat enlarged, of a modification of the sticker positioners in a lowered position.

FIG. 15 illustrates the jaw 108 pivoted upwardly to accept a sticker to be positioned onto a lumber stack. In the downwardly pivoted position as depicted in FIG. 16 surface 112 forms a continuous guide surface spanning the gap between adjacent bottom shelf elements to enable a flow of stickers to subsequent positioners for deposit onto any suitable preselected surface such as selected positions of a lumber stack.

A lumber stack through appropriate elevator means as described earlier will in this embodiment also maintain an uppermost lumber tier in close proximity to lowermost portion 113, avoiding repositioning of stickers about the upper surface of a lumber stack once deposited thereon.

From the foregoing description, the operation of the invention is apparent. Stickers are supplied in unoriented bulk array to magazine support arms 22 whereon they move inwardly by gravity. From a lower inward position, as seen in FIGS. 4 and 13, unscrambling conveyor 20 will deliver a supply of stickers to sticker rollers 21 and over those rollers by gravity to crowder feed conveyor 30. When an adequate supply of stickers has been so provided, photosensitive means 99 will operate to cause the unscrambling conveyor to cease to deliver stickers until the supply has dropped below the level at which photo-sensitive means 99 is activated. Oscillating cam release mechanism 40, operating by actuating cylinder 48 and associated rod 49, will oscillate to release a sticker and position it in a forward position on end portion 45 of oscillating cam mechanisms 43. Distribution conveyor 50 by its "U" shaped lugs 61, will remove these stickers and deliver them about the curve guide and onto the bottom shelf 70 or 106 where sticker positioners 80 or 108 will move to their raised position to allow the distribution conveyor to feed a predetermined number of stickers, matched to the number of pairs of sticker positioners, along the bottom shelf. Sticker positioners will then oscillate downwardly, as illustrated in FIG. 6 or 16, to feed the stickers through guideways 78 or 109 in the respective positioners 80 or 108 onto a top tier of a lumber stack positioned at a proper elevation beneath the sticker positioners by means of a conventional lumber stack elevator platform depicted generally at 100. The process is repeated for each tier of a lumber stack as that lumber tier is positioned by other known mechanism.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described our invention, what we desire to protect by Letters Patent, and what we claim is:

1. Sticker positioning apparatus for use with a lumber stacking device whereby stickers are positioned at spaced intervals along respective tiers of a lumber stack and in substantial vertical alignment with one another in said lumber stack comprising, in combination:

a distribution conveyor, of endless construction with upper and lower horizontal courses cooperating with a curved guide means at the transition from the upper and lower horizontal courses to maintain stickers in cooperative association with the distribution conveyor, for feeding stickers to an apertured shelf means disposed in an overlying relationship to a lumber support means, including elevator means for maintaining a topmost tier of a lumber stack in contiguous vertically adjacent relationship to said sticker positioners when said stacker positioners are in the lowered position;

a plurality of laterally spaced, cooperating pairs of oscillating sticker positioners movable from a raised to a lowered position, said sticker positioners disposed to bridge the apertures defined by said shelf means when in a raised position, and said sticker positiones formed with medially defined guideways to receive and guide stickers from the shelf means onto a top tier of lumber therebeneath when said sticker positioners are in the lowered position; and means for driving said distribution conveyor sand said sticker positioners in synchronization to provide a continuous supply of stickers to said sticker positioners for deposit thereof.

2. Sticker positioning mechanism as set forth in claim 1 wherein an oscillating cam means is operable to deliver stickers in singulated timed sequence from a supply source, for removal by said distribution conveyor at a forwardmost adjacent portion of said cam means, said rearward portion of the oscillating cam means cooperating with a spaced foot member to clampingly engage a sticker and arrest further delivery when said oscillating cam means is in a first position adjacent the foot member, and when said cam means is in a second position, spaced from said foot member, to release an individual sticker from said supply source for presentation to said distribution conveyor at a forwardmost position on said cam means.

3. Sticker positioning apparatus set forth in claim 2 wherein an unscrambling conveyor is positioned to transport stickers from a magazine supply source to a crowder conveyor that in turn provides stickers to said cam means for subsequent singulated timed sequential delivery to said distribution conveyor.

4. Sticker positioning apparatus as set forth in claim 3 wherein detection means is positioned upstream of said crowder conveyor for discontinuing the transport of stickers by the unscrambling conveyor when the detector senses an adequate sticker supply on said crowder conveyor.

5. A sticker positioning apparatus as set forth in claim 3 wherein:

the unscrambling conveyor output is spaced from and higher than the crowder conveyor input, and inclined skate roller means are positioned between the unscrambling conveyor output at an upper level and the crowder conveyor input to transport stickers gravitationally to the crowder conveyor from said unscrambling conveyor.

6. Sticker positioning apparatus as set forth in claim 1 wherein said distribution conveyor has secured thereto, at spaced intervals, "U" shaped lugs with upstanding legs, the upstanding legs of the "U" shaped lugs spaced apart a distance greater then the width of the shelf means to enable the distribution conveyor to be supported by the shelf means in the absence of stickers thereon.

7. A sticker positioning mechanism as set forth in claim 1 wherein said sticker positioners are formed with an upper and lower element in a spaced relationship to define a passageway therebetween to accept a sticker in said medially positioned guideway.

8. A sticker positioning mechanism as set forth in claims 1 wherein said sticker positioners are formed with one single pivoting jaw element that cooperates with a downwardly oriented shelf element to form the medially positioned guideway when the pivoting jaw element is in lowered position.

9. A mechanism for feeding and positioning stickers to successive upper tiers of a lumber stack therebetween, while maintaining vertical alignment of stickers in said stack, comprising, in combination:

an unscrambling conveyor means for removing individual stickers in an orderly arrangement from a magazine supply, and transporting elements on said unscrambling conveyor for transporting stickers to a driven crowder conveyor;

a crowder conveyor positioned to accept stickers from the unscrambling conveyor and transport them to an oscillating cam release mechanism;

an oscillating cam release mechanism having cam release means oscillating from a raised position to a lowered position to release an individual sticker for support at a forward position when the cam release means is in the raised position and means to clampingly halt a sticker fed by the crowder conveyor when cam release means are in a raised position; and a distribution conveyor positioned to remove individual stickers from the forward portion of the cam release mechanism transport them along an upper horizontal course and transfer them from the upper horizontal course to a lower horizontal course therebeneath;

spaced "U" shaped guide means cooperating with said distribution conveyor to maintain sticker's position on said distribution conveyor in transition between the upper and lower courses;

spaced bottom shelf elements positioned downwardly adjacent the distribution conveyor in its lower course to supportingly guide stickers thereby in cooperation with said distribution conveyor; and oscillating sticker positioners disposed to bridge the spaces between the bottom shelf elements when in a raised position and to guidingly accept, in medial guideways defined in the sticker positioners, stickers for distribution to the uppermost layer of a lumber stack therebeneath when a sticker positioner is in lowered position.

* * * * *